June 19, 1956   J. V. COWAN   2,751,479
METHOD AND MEANS FOR INDUCTION WELDING
Filed Feb. 16, 1954   2 Sheets-Sheet 1

June 19, 1956  J. V. COWAN  2,751,479
METHOD AND MEANS FOR INDUCTION WELDING
Filed Feb. 16, 1954  2 Sheets-Sheet 2

United States Patent Office 2,751,479
Patented June 19, 1956

2,751,479
METHOD AND MEANS FOR INDUCTION WELDING

John V. Cowan, Danbury, Conn., assignor to Sperry Products, Inc., Danbury, Conn., a corporation of New York Application February 16, 1954, Serial No. 410,479

4 Claims. (Cl. 219—10)

This invention relates to a method and means for welding, and more particularly it is adapted to the welding of members of large cross-sectional area by inductive means. The difficulty of welding such members by inductive heating is inherent in the nature of induction because the flux tends to concentrate near the surface and thus heat the outer surface more than the interior. If heating is continued until the interior of such large cross-sectional members reaches welding temperature, the outside of the members will have far exceeded the welding temperature, with the result that considerable time and power are consumed. It is therefore one of the principal objects of this invention to provide a method and means whereby the interior of members of large cross-sectional area may be brought to welding temperature at least as rapidly as the outer edge portions. Thus it is necessary only to bring the outer edge portions to welding temperature because this would mean that the interior portions are also at least at welding temperature, so that welding may be effected in the minimum time and with the minimum use of power.

Further objects and advantages of this invention will become apparent in the following detailed description thereof.

In the accompanying drawings.

While the invention is illustrated herein as applied to the welding of rails, it will be understood that rails are typical of a large number of pieces of large cross-sectional area to which this invention is applicable.

Figure 1:
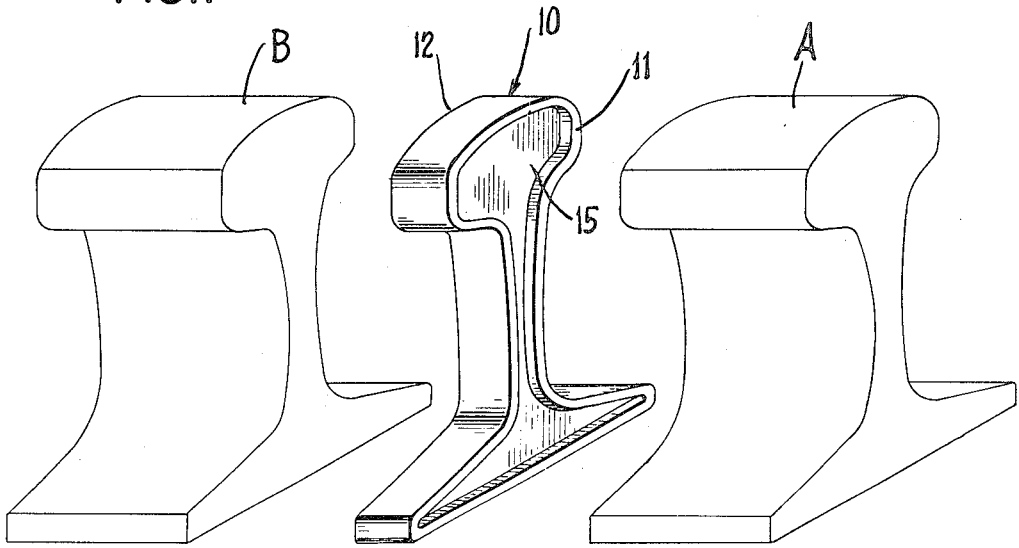
Fig. 1 is an expanded isometric projection of rail ends to which my invention is applied, the induction coil being removed.
Figure 2:
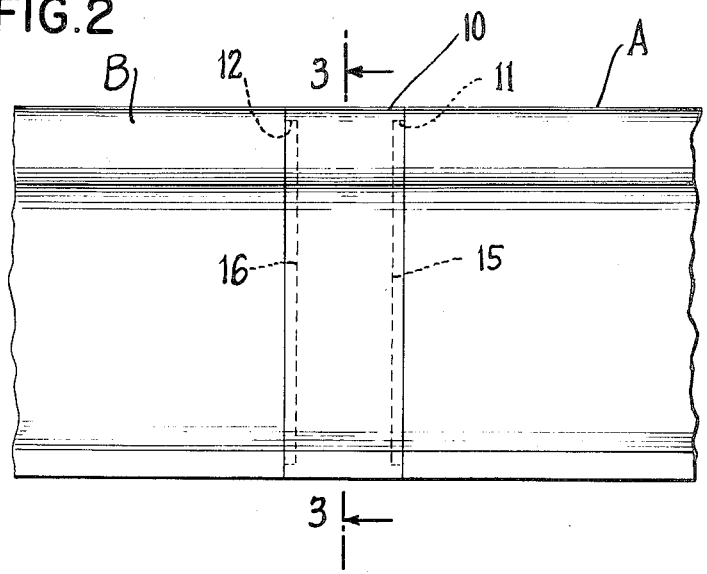
Fig. 2 is a side elevation of the parts of Fig. 1 in operating position.
Figure 3:
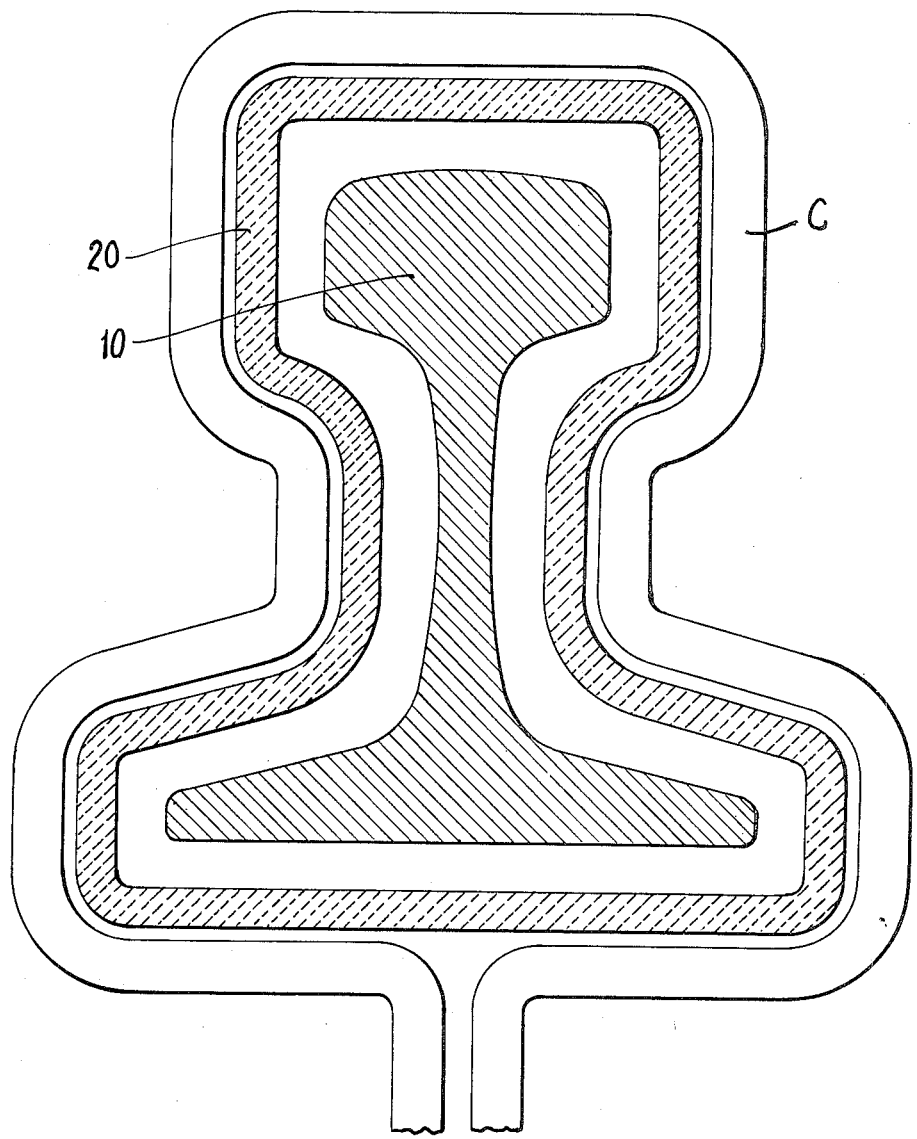
Fig. 3 is a section taken on the line 3—3 of Fig. 2 showing the application of the induction coil to the Figs. 1 and 2 apparatus.

As shown, rail ends A and B are to be welded by inductive heating by a coil C (not shown in Figs. 1 and 2 for clarity, but shown in detail in Fig. 3). As explained in the introduction, inductive heating usually resulted in bringing the outer portion of the body to welding temperature before the inside portions had reached this degree of heat, and in order to bring the interior of the body to welding temperature it was necessary to continue to deliver power. By the time the interior reached welding temperature the outer portions had far exceeded welding temperature. This resulted in loss of both time and power.

By this invention the interior is heated at least as rapidly as the outer edge portions. For this purpose there is employed an intermediate member 10 of the same cross-section as the members A and B to be welded. The intermediate member 10 is provided on both sides with flat outer edge portions 11 and 12 which are adapted to lie flush against the ends of rails A and B when the parts are brought together as shown in Fig. 2. The inside surfaces 15, 16 of the faces of intermediate member 10 are hollowed out so that no contact is made initially between these faces and the ends of rails A and B.

When the parts are brought together as shown in Fig. 2 and heating is effected by coil C, the result of the construction described above is as follows: The more rapidly heated outer edge portions 11 and 12, being in engagement with the rails A and B respectively, transfer their heat by conduction to the rails A and B. The inner surfaces 15 and 16, not being in contact with the rail ends, retain their heat. Thus although the interior of intermediate member 10 does not receive heat as rapidly as the outer edges, this is compensated for by the fact that the interior of member 10 does not conduct its heat into the rail ends as do the outer edges, but rather retains more of the heat. As a result the interior will heat up at least as rapidly as the outer edge portions. Therefore the outer edge portions need only to be brought up to welding temperature to insure that the interior of the member 10 is also at welding temperature or higher. When push-up occurs, the heat of the interior sections 15, 16 of the intermediate member 10 is transferred to the interior portions of the ends of rails A and B to bring the latter interior portions rapidly up to welding temperature. Therefore no time need be lost due to raising the temperature of the outer edge portions of intermediate member 10 above welding temperature, and it follows from the foregoing that such excess use of power is avoided.

An additional advantage resulting from the above method and apparatus resides in the fact that when the outer edges of members to be welded are heated above welding temperature in order to bring the interior parts to welding temperature, the outer portions are excessively molten so that after push-up a large bead spread over a wide area is obtained. Such bead required considerable grinding and was difficult to remove. By the use of this invention, where the outer edges are not raised above welding temperature, a relatively small, thin bead is obtained, and such bead is readily removable.

The relative positioning of induction coil C is shown in Fig. 3. The coil preferably has a configuration conforming to the outline of the rail sections to be welded. If the invention is applied to the welding of members having contours different from that of rails, the inductor will conform to the contour of the members. It surrounds the intermediate member 10 with a ceramic liner 20 interposed between the coil and the rail. The coil is here shown as a single winding inductor, but any number of turns may be employed.

Having described my invention, what I claim and desire to secure by Letters Patent is:

1. The method of inductively welding parts of relatively large cross-sectional areas in which the outer portions normally tend to heat up faster than the inner portions, which consists in positioning between the parts to be welded an auxiliary member of the same material and cross-section as said parts, heating the auxiliary member inductively, conducting the heat from the outer portion of said auxiliary member to said parts, insulating the inner portion of said auxiliary member against heat transfer to said parts prior to the welding push-up, pushing the parts and said auxiliary member together after the outer portion of said member has reached welding temperature whereby the inner portion of said member will transfer its heat to the inner portions of said parts.

2. A device for inductively welding parts of relatively large cross-sectional areas in which the outer portions normally tend to heat up faster than the inner portions, comprising a member of the same material and having the same cross-section as said parts, said member being positioned between said parts, said member having an outer portion engaging the faces of said parts, said member having an inner portion whose opposed faces are spaced from the inner portions of the faces of said parts when the outer portions of said member engage the faces of said parts, an inductor for heating said member, the outer portions of said parts conducting heat away from the outer portion of said member with which they make contact, said parts and said member being adapted to be pushed together when the outer portion of said member reaches welding temperature so that the heat of the inner portion of said member is transferred to the inner portions of said parts.

3. A device as specified in claim 2, in which the insulation of the inner portion of said member from conducting heat into said parts is effected by spacing the faces of said inner portion from the faces of said parts.

4. A device as specified in claim 3, in which the spacing of the faces of the inner portion of said member from the faces of said parts is effected by making said inner portion thinner than the outer portion of said member.

References Cited in the file of this patent

UNITED STATES PATENTS

| | | |
|---|---|---|
| 551,649 | Raymond | Dec. 17, 1895 |
| 1,712,524 | Schultz | May 14, 1929 |
| 2,448,690 | Storm | Sept. 7, 1948 |
| 2,455,136 | Obert | Nov. 30, 1948 |
| 2,456,091 | Stevens et al. | Dec. 14, 1948 |
| 2,464,727 | Storm | Mar. 15, 1949 |

FOREIGN PATENTS

| | | |
|---|---|---|
| 22,261 | Great Britain | of 1898 |